(No Model.) 2 Sheets—Sheet 1.

S. DAVIS.
HARROW.

No. 262,280. Patented Aug. 8, 1882.

(No Model.) 2 Sheets—Sheet 2.

S. DAVIS.
HARROW.

No. 262,280. Patented Aug. 8, 1882.

Witnesses:
William H. Mortimer
W. H. Kerr

Inventor:
S. Davis
per
F. A. Lehmann,
Att'y

United States Patent Office.

SAMUEL DAVIS, OF MOUNT VERNON, OHIO.

HARROW.

SPECIFICATION forming part of Letters Patent No. 262,280, dated August 8, 1882.

Application filed June 3, 1882. (No model.)

*To all whom it may concern:*

Be it known that I, SAMUEL DAVIS, of Mount Vernon, in the county of Knox and State of Ohio, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists, first, in the combination of wooden front and rear beams with a bar made of what is known as an "I beam rail," which is bent diagonally back and forth inside of the frame, and to which the harrow-teeth are secured; second, in the castings which are secured to the side of the iron beam, and which has a socket made in its side to receive the casting, against which the tooth is clamped by the clamping-bolt, the socket and the casting being so shaped that the tooth can be adjusted in or out or back and forth without having to more than loosen the bolt very slightly.

Figure 1:
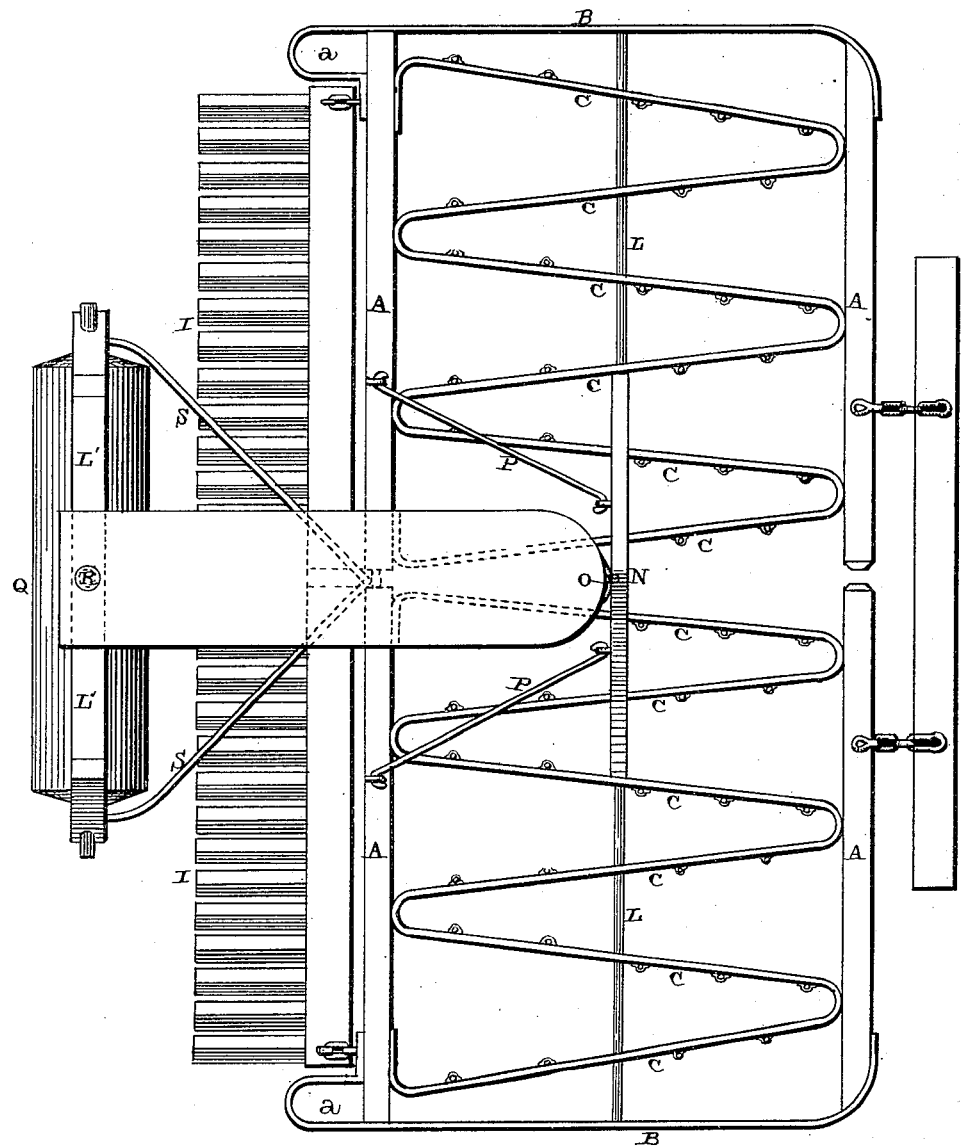
Figure 2:
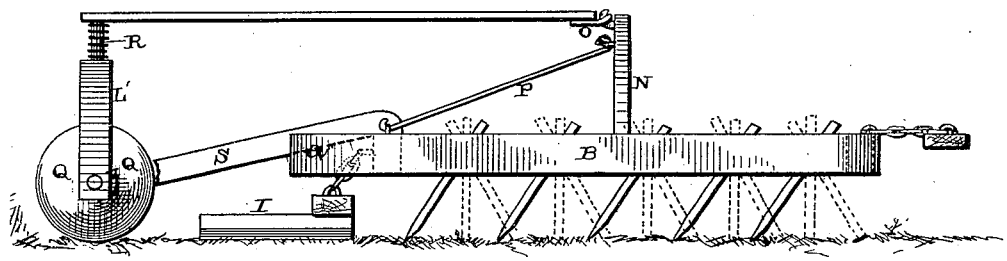
Figure 3:
Figure 4:
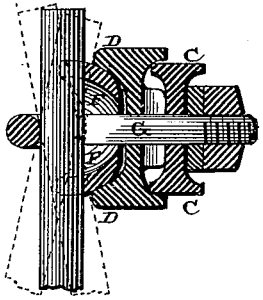

Figure 1 is a plan view of my invention complete. Fig. 2 is an edge view of the same. Fig. 3 is a vertical cross-section of the iron beams. Fig. 4 is a vertical section of the castings by which teeth are secured in position, showing the positions into which the teeth can be adjusted in dotted lines.

The harrow is formed of two sections, which are loosely connected together at one end in any suitable manner, so that the harrow can accommodate itself to the inequalities of the ground, so that either side can be raised up for the purpose of passing over stumps, stones, or other obstructions. Each section is composed of the two front and rear beams, A, which are united together at their outer ends by the flat iron bar B, which not only serves to unite the two pieces together, but to form a runner upon which the harrow can be moved. The outer end of each one of the front bars is beveled away, as shown, so that the sections will run over any obstructions they may encounter. The rear ends of the two bars or plates B are made to extend a suitable distance beyond the rear side of the rear beams, and are shaped so as to form hand-holds a, by which the section can be turned upward when so desired.

The bar C, to which the teeth are secured, is formed of what is known as an "I-beam," and this bar is bent back and forth, as shown, the ends being securely fastened in any suitable manner to the front and rear beams, A. Part of the teeth are secured upon one side of the bar and part upon the other, and the teeth are placed in such relation to each other that it is impossible for a clod to pass through the harrow without being struck by one of the teeth. By bending this bar back and forth inside of the beam A, not only is each section made very strong, but the teeth are enabled to be placed in the best possible relation to each other. Each one of the teeth is secured to its bar by means of the casting F, which has a suitable flange formed upon its top edge, so as to catch over the side of the beam, and which has a rounding socket formed in its outer side to receive the cup-shaped casting F, against which the tooth is clamped by the eyebolt G. This socket in the casting is made concave, as here shown, so that the cup can turn freely therein, for the purpose of throwing the lower end of the tooth either in or out or back and forth like a universal joint. As this cup is held in the socket by frictional contact alone, when it is desired to adjust the tooth into any desired position it can be done by slightly loosening the nut upon the bolt and then striking the tooth a slight blow with a hammer. By thus giving each tooth a universal joint it will readily be seen that it can be adjusted into many different positions in relation to the beam, and thus adapt the harrow to do work which cannot be accomplished with harrows where the teeth are rigid or are given a simple inclination alone.

Loosely attached to the rear edge of the two sections of the harrow is the clod-crusher I, which consists of a longitudinal beam to which a number of square bars are rigidly attached, the sharp edges of the bars being turned downward for the purpose of pulverizing and breaking the clods. As this crusher is merely hooked at the rear edge of the harrow, it can be readily removed and replaced whenever so desired.

The seat for the harrow, upon which the driver rides, is made long enough to extend a suitable distance beyond the rear beam of the harrow, so that the driver can move back and forth upon the seat, and thus bring his weight directly upon the harrow, or can move backward, so that the harrow will run very lightly. The iron bars to which the teeth are secured are braced near their centers by the cross-rods L, to which rods are secured the two uprights N, which support the front end of the seat. These uprights have their ends secured together, and are attached to the under side of the seat by a suitable rod or brace, O. In order to brace these supports in position and prevent them from moving either forward or back, a brace-rod, P, is used, which has its rear end fastened to the rear beam of the harrow. The rear end of this seat is supported by the roller Q, which is journaled in a suitable frame, L'. This frame extends vertically upward, and has a rod, guide, or pin, R, projecting down from the rear end of the seat passing into it. Around this rod is placed a suitable spring, which serves to give the seat sufficient elasticity to make it pleasant to ride upon. Fastened to the inner side of this frame, in which the roller is journaled, is a suitable brace, S, which serves to fasten the roller to the harrow, and which has its front end made to catch over a suitable pin, which unites the two sections of the harrow together. When the driver is sitting upon the front end of the seat his whole weight is thrown upon the harrow; but the farther he moves backward upon the seat the more his weight is transferred from the harrow to the roller.

Having thus described my invention, I claim—

1. In a harrow, the combination of the front and rear beams, A, with the iron bar C, to which the teeth are secured, and which is bent diagonally back and forth between the front and rear beams, substantially as shown.

2. The combination, with the I-shaped iron bar C, of the casting secured to the side of the beam, and which has a cup-shaped socket formed in its outer side, the cup-shaped bearing against which the tooth is clamped, and the clamping-eyebolt and harrow-tooth, whereby the harrow-tooth is given a universal motion, substantially as set forth.

In testimony whereof I affix my signature in presence of two witnesses.

S. DAVIS.

Witnesses:
F. A. LEHMANN,
W. H. KERN.